United States Patent [19]

Fecan et al.

[11] Patent Number: 4,477,415

[45] Date of Patent: Oct. 16, 1984

[54] APPARATUS FOR STORING AND PRODUCING HYDROGEN FROM A SOLID COMPOUND

[75] Inventors: Jean C. Fecan, Merignac; Jean Morin, Antony, both of France

[73] Assignee: Commissariat a l'Energie Atomique, Paris, France

[21] Appl. No.: 380,714

[22] Filed: May 21, 1982

[30] Foreign Application Priority Data

Jun. 2, 1981 [FR] France ................. 81 10882

[51] Int. Cl.³ ................. C01B 3/50; C01B 3/56
[52] U.S. Cl. ................. 422/164; 55/74; 55/417; 422/199; 423/648 R
[58] Field of Search ............ 423/648 R; 422/164, 422/199, 239, 49; 55/74, 417, 498, 16

[56] References Cited

U.S. PATENT DOCUMENTS

| | | | |
|---|---|---|---|
| 3,222,122 | 12/1965 | Johnson et al. | 423/648 R X |
| 3,841,064 | 10/1974 | Hitchener et al. | 55/417 X |
| 3,910,831 | 10/1975 | Helart | 55/74 X |
| 3,918,933 | 11/1975 | Martin | 55/16 |
| 4,249,654 | 2/1981 | Helverson | 423/648 R X |
| 4,302,436 | 11/1981 | Sirouich et al. | 423/648 R X |
| 4,383,606 | 5/1983 | Hunter | 423/648 R X |

FOREIGN PATENT DOCUMENTS

| | | | |
|---|---|---|---|
| 16576 | 10/1980 | European Pat. Off. | |
| 2361602 | 3/1978 | France | |
| 5032729 | 3/1980 | Japan | 423/648 R |
| 1568374 | 5/1980 | United Kingdom | 423/648 R |

*Primary Examiner*—Barry Richman
*Assistant Examiner*—William R. Johnson
*Attorney, Agent, or Firm*—Pearne, Gordon, Sessions, McCoy, Granger & Tilberry

[57] ABSTRACT

An apparatus for the storage and production of hydrogen from a solid compound.

The solid compound is a compound of at least one rare earth and a metal of group VIII of the periodic system, which can selectively fix hydrogen by hydrogenation. It is placed within a sealed container and is in a compact and machinable or workable form.

9 Claims, 1 Drawing Figure

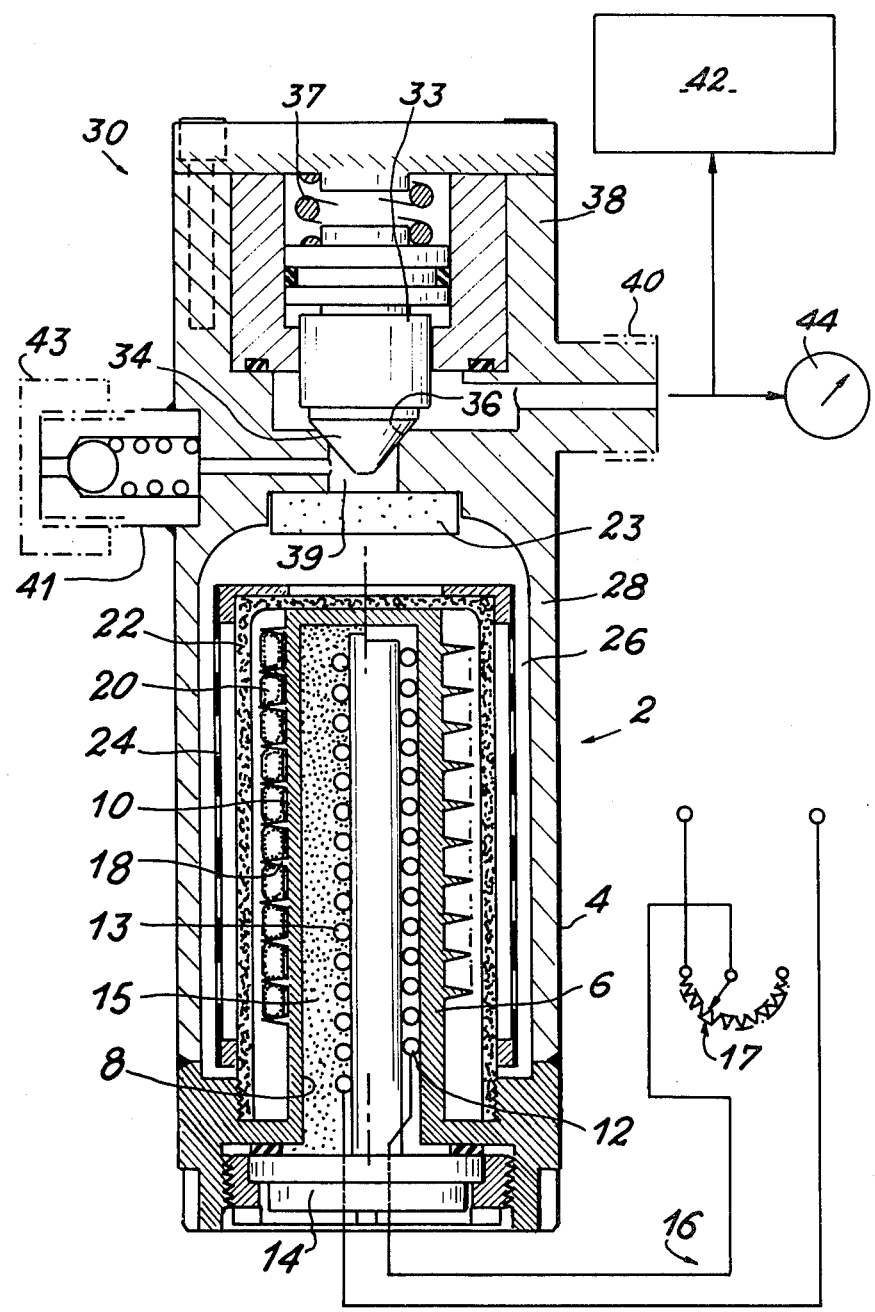

APPARATUS FOR STORING AND PRODUCING HYDROGEN FROM A SOLID COMPOUND

BACKGROUND OF THE INVENTION

The invention relates to an apparatus for storing and producing hydrogen from a solid compound having reduced overall dimensions and permitting the storage of hydrogen under a low pressure (from a few tenths of a bar to a few bars) and a low volume.

A large number of hydrogen storage means are constituted by metal cylinders in which the hydrogen is stored under a high pressure. This is disadvantageous from the safety standpoint due to risks of leaks and explosions, so that it is often necessary to place the cylinders outside buildings.

Other systems use a solid compound able to fix hydrogen by hydrogenation. In most cases this compound is in the form of a powder or grains placed within a sealed container having a hydrogen inlet and a hydrogen outlet. Heating means, generally outside the container, make it possible to heat the solid compound in order to cause the giving off of hydrogen.

Although such apparatuses eliminate explosion risks, they have the disadvantage of being relatively large because the compound is in the form of powder or grains and a large quantity is required for storing a large hydrogen volume and because the heating means are positioned outside the container.

BRIF SUMMARY OF THE INVENTION

The object of the present invention is to eliminate these disadvantages by proposing an integrated apparatus permitting the storage of a large quantity of hydrogen with a low volume.

According to the main feature of the apparatus according to the invention the latter is of the type in which the solid compound, placed within a sealed container, is a compound of at least one rare earth and a metal of Group VIII of the periodic system able to selectively fix hydrogen by hydrogenation, wherein the solid compound is in a compact and machinable or workable form.

The compound used for fixing the hydrogen only absorbs the latter and is insensitive to the impurities which the gas might contain and it is in this sense that the above expression "selectively fix hydrogen" is to be understood.

According to another feature of the apparatus according to the invention, the solid compound is of formula:

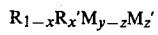

$R_{1-x}R_x'M_{y-z}M_z'$

R and R' being rare earths chosen from the group of lanthanides, M being a metal from group VIII of the periodic system, M' a metal of groups III, IV or VII of the periodic system, x a number between 0 and 1, y a number between 4.7 and 5.5 and z a number between 0 and 2.

The rare earths R and R' are preferably chosen from lanthanum, praseodymium, neodymium, samarium and gadolinium. Among the metals of group VIII, nickel and cobalt are particularly suitable within the scope of the present invention and they may or may not be substituted by a metal M' of groups III, IV or VII, such as e.g. aluminium.

According to another feature of the apparatus according to the invention, the latter incorporates heating means for raising the temperature of the hydrogenated solid compound to an adequate value for bringing about the giving off of hydrogen, said heating means being placed within the sealed container.

According to a preferred embodiment the apparatus comprises a support for the solid compound placed within the sealed container and having a cylindrical shape, whilst carrying on its outer face a rib or fin arranged in a helical manner so as to define a screw thread. Advantageously the support is shaped like a hollow cylinder, heating means being placed within the said hollow cylinder.

In this case the solid compound is in the form of an internally threaded cylindrical mass enabling it to be screwed to the helically arranged fin or rib.

According to a special embodiment, the solid compound is a lanthanum nickel mass shaped from a powder of grain size below 63µ, compacted at ambient temperature and under a pressure above 10,000 bars.

According to a final feature of the apparatus according to the invention, it comprises means for controlling the discharge of hydrogen, which can be constituted by a valve terminated by a needle and tightly applied to a valve seat by means of a calibrated screw.

DESCRIPTION OF THE DRAWING AND PREFERRED EMBODIMENTS

The invention is described in greater detail hereinafter relative to non-limitative embodiments and with reference to the attached drawing, which is a diagrammatic sectional view of the apparatus according to the invention.

It can be seen that the apparatus 2 essentially comprises a sealed container 4 which, in the present embodiment, is cylindrical. Within the latter is placed a metal support 6 shaped like a hollow cylinder and being of a generally tube-like shape, whose wall has an inner face 8 and an outer face 10. Heating means, in the present case an electrical resistor 12, are placed within the support 6 and facing the inner face 8 thereof. The resistor 12 is connected by means of wires passing through the lower part 14 of container 4 to an electrical circuit 16. A rheostat 17 makes it possible to regulate the filament power of resistor 12. As appropriate, the turns of resistor 12 can be positioned close to the inner wall 8 of support 6, or a resistor 13 can be positioned in the vicinity of the axis of support 6, whilst a heat transmitting product 15 is located between resistor 13 and face 8.

The outer face 10 of support 6 is provided with ribs or fins 18, which have a double function. They serve as a support for solid compound 20 and also transmit heat to said solid compound on starting up electrical resistor 12 to bring about the giving off of hydrogen.

In the presently described embodiment, the solid compound 20 is lanthanum nickel LaNi₅ and in fact only a single rib is helically arranged around support 6. Thus, the rib defines a screw thread on to which is screwed the lanthanum nickel mass. The latter is in the form of a cylindrical mass shaped from a powder with a grain size below 63µ, compacted at 20° C. under a pressure of 13,000 bars and internally threaded so that it can be screwed on to the helical rib 18. Optionally the shaping conditions can be varied, but the shaping operation must be carried out at ambient temperature and the compacting pressure must exceed 10,000 bars.

It is obvious that other arrangements are possible. For example, it is possible to envisage a group of circular ribs on which are placed lanthanum nickel rings.

The drawing also shows a filter 22 surrounding support 6 and serving to prevent a possible passage of lanthanum nickel particles at the time when hydrogen is being given off. In the presently described embodiment the filter is a stainless steel knitted product held in place by a perforated sheet 24. According to a variant a filtering pellet 23 can be positioned on the hydrogen outlet. Finally a space 26 is made between filter 22 and wall 28 of container 4 in order to permit the passage of hydrogen, either at the time of filling, or at the time of use.

The apparatus also comprises hydrogen introduction means constituted by an end fitting 41, provided with a valve 43 and which can be connected to a not shown, pressurized hydrogen storage means.

The means for controlling the discharge of hydrogen comprise a valve 33 terminating with a needle 34 and tightly applied to a valve seat 36. A calibrated spring 37 holds the valve 33 in the closed position. When the latter is in the open position (spring 37 compressed under the action of the hydrogen pressure), a passage 39 links the inner space 26 of the container with a discharge end fitting 40, which can be connected to a utilization apparatus 42. If necessary, a pressure gauge 44 can be placed on end fitting 40.

The apparatus according to the invention functions in the following way. For filling, valve 43 is opened and end fitting 41 is connected to the pressurized hydrogen storage means. The gas is thus passed through space 26 and filter 22 up to the lanthanum nickel to which it is fixed by hydrogenation. The reaction continues up to the saturation of the lanthanum nickel, which corresponds to a hydrogen pressure of approximately 5 to 7 bars in space 26, followed by the closure of valve 43.

When it is desired to sample the hydrogen contained in container 4, the electrical circuit 16 is closed and the electrical resistor 12, regulatable by means of rheostat 17 starts to heat. In turn support 6 is heated, either directly, or via product 15 and the heat is transmitted to the lanthanum nickel by ribs 18. The temperature of the latter increases and the hydrogen starts to be eliminated by dehydrogenation.

The pressure of the latter in space 26 increases and then raises valve 33 and compresses spring 37. Thus, the hydrogen passes through passage 39 and end fitting 40 up to utilization apparatus 42.

It is pointed out that on maintaining a constant heating pressure, the temperature of the lanthanum nickel remains constant and the giving off of hydrogen ceases on reaching the equilibrium conditions for the chemical dehydrogenation reaction. Valve 33 closes if the calibration of spring 37 has been regulated to a pressure above the reaction equilibrium pressure for the particular temperature.

In order to ensure a continuous giving off of hydrogen, it is necessary to manipulate rheostat 17 to further increase the heating pressure. The reaction is then displaced in the sense of hydrogen liberation and the pressure increases, whilst valve 33 opens again.

Thus, it is possible to program the production of hydrogen by calibrating spring 37 to an adequate pressure and by programming the setting of rheostat 17 as a function of time.

The apparatus according to the invention has important advantages, the most significant being that of being able to store hydrogen in a low volume, because the solid compound is in compact form and not in the form of powder or grains. Moreover, the fact that it is machinable or workable permits constructions like that described hereinbefore, where it is screwed to a support within which are located the heating means. Thus, the overall dimensions of the system are greatly reduced. Moreover, the fact that the hydrogen is absorbed by a solid compound obviates the leakage and explosion risks encountered with conventional cylinders. Finally, safety is increased by the presence of calibrated spring 37 because, even in the case of an accidental temperature rise, part of the hydrogen can be given off, but equilibrium conditions are soon reached and valve 33 closes again.

It is obvious that the invention is not limited to the embodiment described hereinbefore and in fact covers all variants thereof.

What is claimed is:

1. An apparatus for the storage and production of hydrogen comprising:
    a sealed container having hydrogen inlet means and hydrogen outlet means;
    a metallic support within said container having an outer face and being of a generally tube-like shape, and having at least one rib on its outer face;
    a solid compound able to selectively fix hydrogen by hydrogenation and release hydrogen upon heating thereof, wherein said solid compound is a machineable mass of compacted powder shaped and positioned to surround said outer face of said metallic support and mechanically engages said at least one rib and thereby is mounted on said support in a fixed position relative thereto;
    a filter in said container and surrounding said solid compound;
    said solid compound in said fixed position being disposed intermediate said support and said filter; and
    heating means inside said metallic support.

2. An apparatus as in claim 1, wherein the solid compound is a lanthanum-nickel mass shaped from a powder having a grain size below 63μ, compacted at ambient temperature and under a pressure above 10,000 bars.

3. An apparatus as in claim 1, wherein said hydrogen outlet means comprise a valve terminated by a needle and tightly applied to a valve seat by means of a calibrated spring in order to control hydrogen discharge.

4. An apparatus according to claim 1, wherein said support is cylindrical and has on its outer face a plurality of circular ribs, and said solid compound being in the form of a plurality of rings disposed on said ribs.

5. An apparatus according to claim 1, wherein said support is cylindrical and said rib is helical, and said solid compound being in the form of a cylindrical mass which is internally threaded to engage said rib.

6. An apparatus according to claim 1, wherein said rib supports and conducts heat to said solid compound.

7. An apparatus as in claim 1, wherein said solid compound is a compound of at least one rare earth and a metal of group VIII of the periodic system.

8. An apparatus as in claim 7, wherein said compound is of the formula:

$$R_{1-x}R_x'M_{y-z}M_z'$$

where R and R' are rare earths of the lanthanide group, M a metal of group VIII of the periodic system, M' a metal of groups III, IV or VII of the periodic system, x a number between 0 and 1, y a number between 4.7 and 5.5 and z a number between 0 and 2.

9. An apparatus for the storage and production of hydrogen comprising:
- a sealed container having hydrogen inlet means and hydrogen outlet means;
- a metallic cylindrical support within said container having an outer face, and having at least one rib on its outer face;
- a solid compound of at least one rare earth and a metal of group VIII of the periodic system, which is able to fix hydrogen by hydrogenation and release hydrogen upon heating thereof, said rib being helical and said solid compound being in the form of a cylindrical mass which is internally threaded and being positioned to surround said metallic support to engage said rib on the outer face thereof;
- a filter in said container and surrounding said solid compound; and
- heating means inside said metallic support.

* * * * *